United States Patent
Woods et al.

(10) Patent No.: US 8,855,990 B1
(45) Date of Patent: Oct. 7, 2014

(54) SYSTEM, METHOD, AND COMPUTER PROGRAM FOR PROVIDING VALIDATION OF NETWORK MODEL OBJECTS WITHIN A NETWORK MODEL DESIGN PROCESS

(75) Inventors: Ashley Lewis Woods, Swindon (GB); Johnston Harden Graham Glendinning, Brasford-on-Avon (GB); Petrus Johannes Eksteen, Trowbridge (GB)

(73) Assignee: Amdocs Software Systems Limited, Dublin (IE)

(*) Notice: Subject to any disclaimer, the term of this patent is extended or adjusted under 35 U.S.C. 154(b) by 171 days.

(21) Appl. No.: 13/165,705

(22) Filed: Jun. 21, 2011

(51) Int. Cl.
 *G06F 17/50* (2006.01)

(52) U.S. Cl.
 USPC .............................................. 703/13; 703/21

(58) Field of Classification Search
 None
 See application file for complete search history.

(56) References Cited

U.S. PATENT DOCUMENTS

| | | | |
|---|---|---|---|
| 7,536,290 B1 * | 5/2009 | Browning et al. | 703/21 |
| 7,725,483 B2 | 5/2010 | Poyourow et al. | |
| 8,280,919 B2 * | 10/2012 | Krishnaswamy et al. | 707/803 |
| 8,291,378 B2 * | 10/2012 | Arnold et al. | 717/120 |
| 8,321,548 B2 * | 11/2012 | Glendinning et al. | 709/223 |
| 2003/0150909 A1 | 8/2003 | Markham et al. | |
| 2010/0217752 A1 | 8/2010 | Deenadhayalan et al. | |

* cited by examiner

*Primary Examiner* — Thai Phan
*Assistant Examiner* — Herng-Der Day
(74) *Attorney, Agent, or Firm* — Zilka-Kotab, PC

(57) ABSTRACT

A system, method, and computer program product are provided for providing validation of network model objects within a network model design process. In use, a request to create a design of at least a portion of a network model is received via an interface utilized for creating a network model design. Additionally, at least one object of the network model capable of being utilized to create the design of the at least a portion of the network model is identified, in response to the request. Furthermore, it is determined whether at least one discrepancy has been identified for the at least one object. Moreover, a response to the request to create the design of the at least a portion of the network model is provided that is based on the determination of whether the at least one discrepancy has been identified for the at least one object.

15 Claims, 5 Drawing Sheets

SYSTEM, METHOD, AND COMPUTER PROGRAM FOR PROVIDING VALIDATION OF NETWORK MODEL OBJECTS WITHIN A NETWORK MODEL DESIGN PROCESS

FIELD OF THE INVENTION

The present invention relates to network models, and more particularly to validations associated with the network models.

BACKGROUND

Traditionally, data integrity systems have been provided for validating network model designs. In particular, a network model design, which typically represents an ideal or planned configuration of a network, is compared with data representative of an actual configuration of the network. Each difference identified based on the comparison is then identified as a discrepancy of the network model design. Unfortunately, techniques for responding to network model design discrepancies identified from the network model design validation have generally been limited to reporting the network model design discrepancies independent of, and thus not in the context of, any actual network model design process.

There is thus a need for addressing these and/or other issues associated with the prior art.

SUMMARY

A system, method, and computer program product are provided for providing validation of network model objects within a network model design process. In use, a request to create a design of at least a portion of a network model is received via an interface utilized for creating a network model design. Additionally, at least one object of the network model capable of being utilized to create the design of the at least a portion of the network model is identified, in response to the request. Furthermore, it is determined whether at least one discrepancy has been identified for the at least one object. Moreover, a response to the request to create the design of the at least a portion of the network model is provided that is based on the determination of whether the at least one discrepancy has been identified for the at least one object.

DETAILED DESCRIPTION

Figure 1:
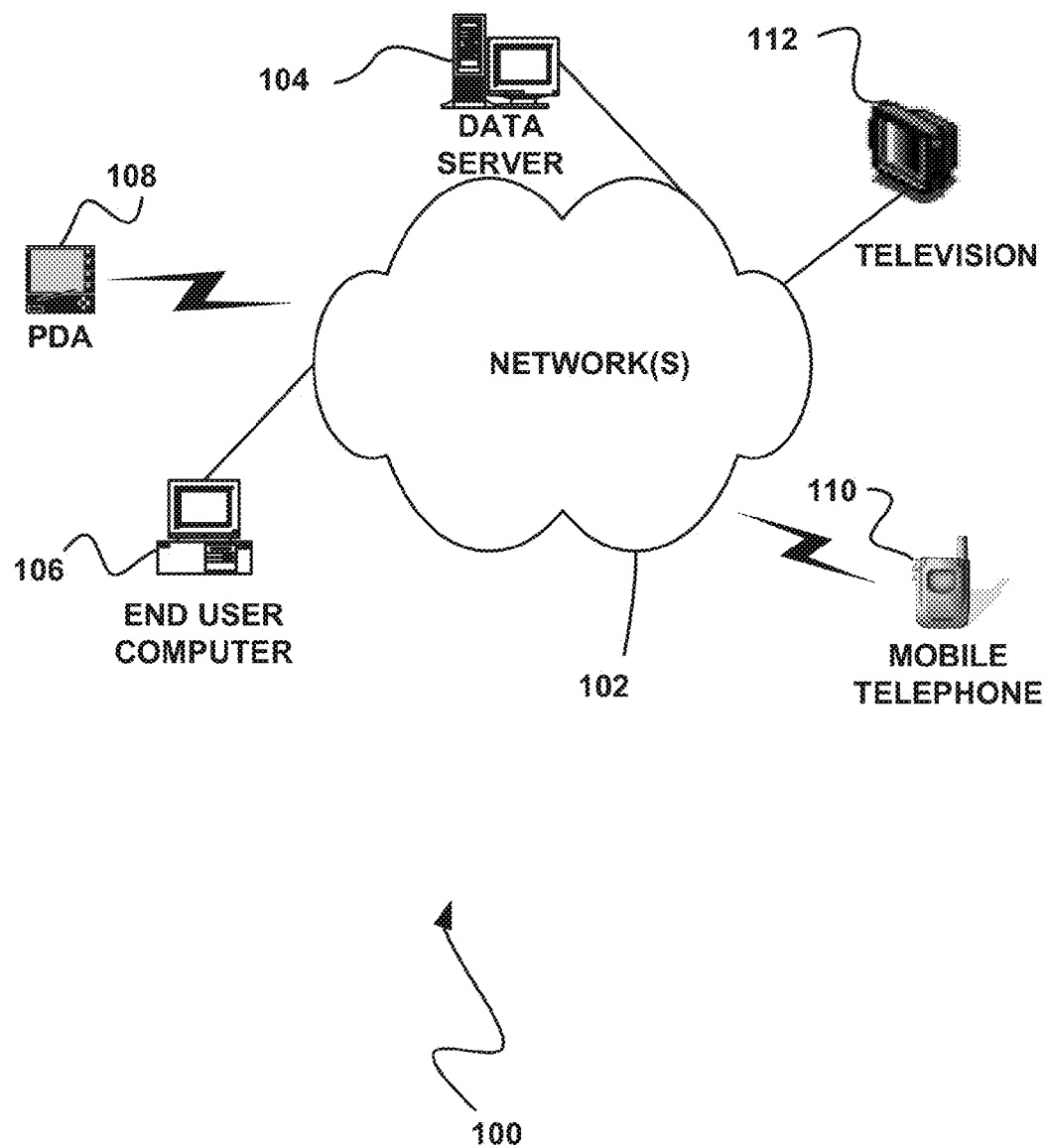
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
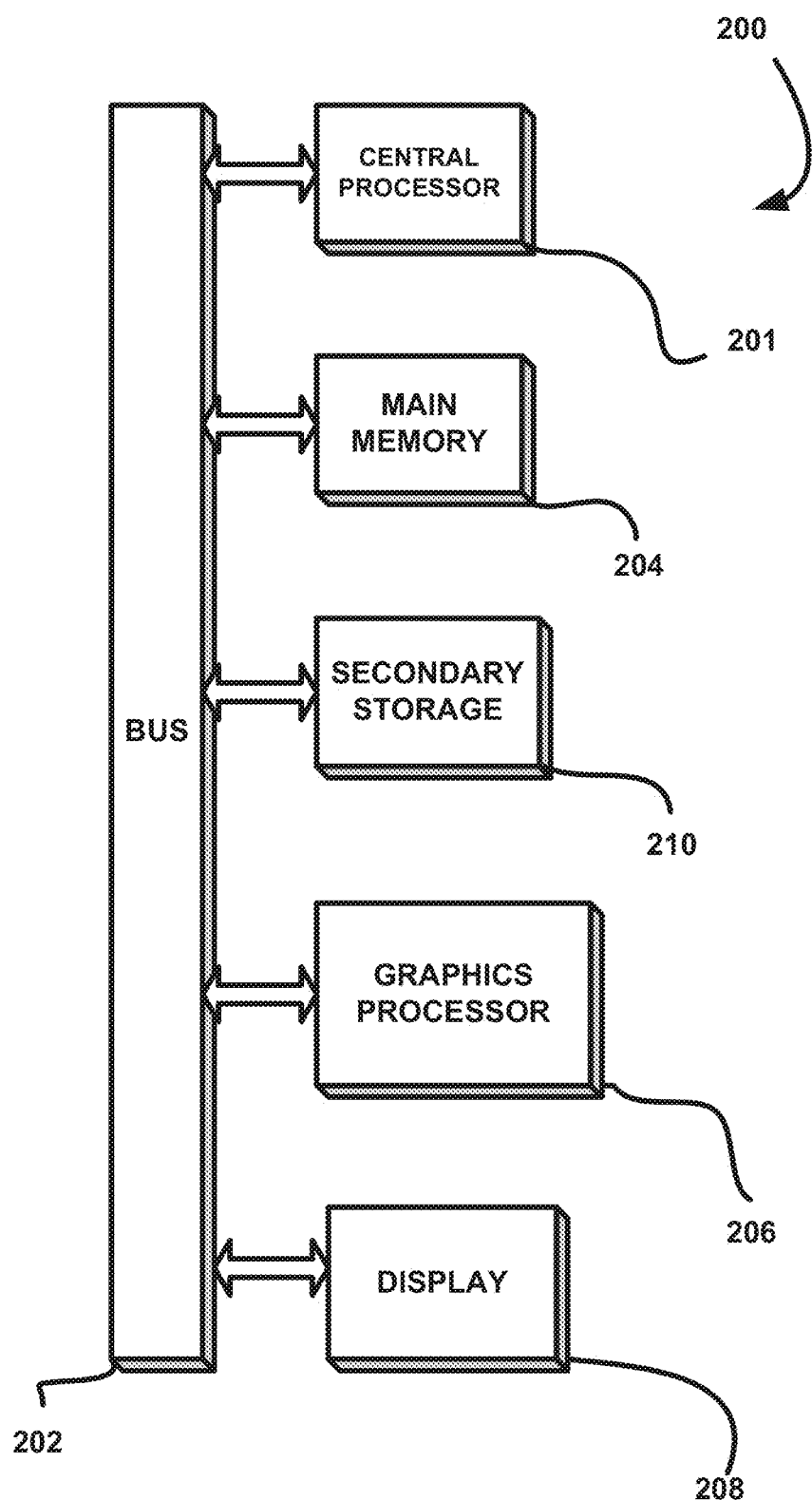
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
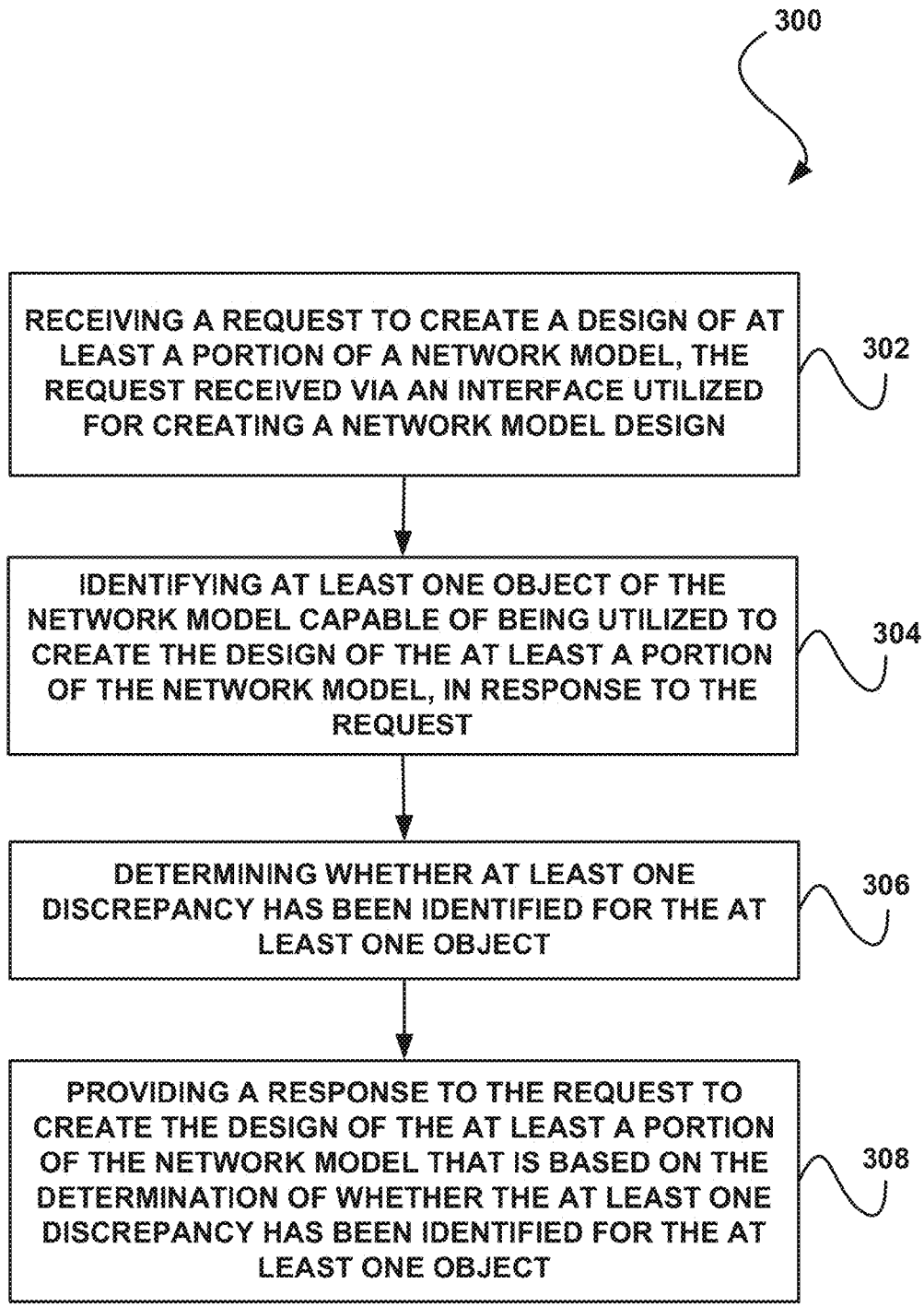
FIG. 3 illustrates a method for providing validation of network model objects within a network model design process, in accordance with one embodiment.

FIG. 3 illustrates a method 300 for providing validation of network model objects within a network model design process, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a request to create a design of at least a portion of a network model is received via an interface utilized for creating a network model design. In the context of the present description, the network model includes any model (e.g. data representation, configuration, etc.) of a network. For example, the network model may include a planned configuration of a network, such as a planned configuration of the interconnections between resources (e.g. computers, servers, routers, etc.) within the network. Such network model may optionally be utilized as a basis for configuring the network (i.e. such that the actual network is configured to reflect the network model).

To this end, the design of the at least a portion of the network model which is requested to be created may include any model according to the aforementioned definition which is for at least a portion (e.g. sub-part, etc.) of the network. For example, the design of the at least a portion of the network model may include a planned configuration of the at least a portion of the network. As another example, the design of the at least a portion of the network model may include a planned configuration of at least one resource (e.g. an interconnection between resources) within the at least a portion of the network.

It should be noted that the request to create the design of the at least a portion of the network model may indicates the design of the at least a portion of the network model. In one embodiment, the request may indicate one or more objects, each representative of a different resource, which are the subject of the creation of the design of the at least a portion of the network model. In another embodiment, the request may indicate an action to be performed with respect to such object(s) for creating the design of the at least a portion of the network model. Just by way of example, the request may be to add the object(s) to the at least a portion of the network model, remove the object(s) from the at least a portion of the network model, provide an interconnection between the object(s) within the at least a portion of the network model, etc.

As an option, the request to create the design of the at least a portion of the network model may be manually initiated by a user via the interface utilized for creating the network model design. For example, with respect to such option, the interface may include a graphical user interface (GUI) capable of accepting input from the user in the form of the request. In this way, the GUI may be utilized for selecting the object(s) which are to the subject of the creation of the design of the at least a portion of the network model, selecting an action to be performed with respect to such object(s) for creating the design of the at least a portion of the network model, etc.

As another option, the request to create the design of the at least a portion of the network model may be automatically initiated by an application via the interface utilized for creating the network model design. For example, with respect to such option, the interface may include an application program interface (API). In one embodiment, the API may receive from the application the automatically initiated request (e.g. generated based on predefined rules, etc.) to create the design of the at least a portion of the network model.

Additionally, as shown in operation 304, at least one object of the network model capable of being utilized to create the design of the at least a portion of the network model is identified, in response to the request. As noted above, the request create the design of the at least a portion of the network model may optionally indicate the at least one object. With respect to such optional embodiment, the at least one object of the network model may be identified from the request to create the design of the at least a portion of the network model.

Of course, however, it should be noted that the at least one object of the network model capable of being utilized to create the design of the at least a portion of the network model may be identified in any other desired manner. For example, in another embodiment, the object(s) of the network model capable of being utilized to create the design of the at least a portion of the network model may be identified based on information included in the request.

Furthermore, as shown in operation 306, it is determined whether at least one discrepancy has been identified for the at least one object. In the context of the present description, the discrepancy may include any data associated with the at least one object which is inconsistent between at least two data sources (e.g. such that the data is known to be inaccurate). For example, the discrepancy may include data associated with the at least one object which is inconsistent between the network model and a data source external to the network model, such as an inventory storing data representing an actual configuration of the network represented by the planned configuration of the network model.

Thus, the discrepancy may be identified when a portion of the planned configuration of the network model associated with the object does not match a portion of an actual configuration of the network which is associated with the object. In one exemplary embodiment, the discrepancy may be identified when a utilization (or lack thereof) of the object in the network model design does not necessarily match a utilization of a resource represented by the object in the actual configuration of the network. In another exemplary embodiment, the discrepancy may be identified when interconnections of the object in the network model design does not necessarily match interconnections of the resource represented by the object in the actual configuration of the network.

As an option, the determination of whether the at least one discrepancy has been identified for the at least one object may be based on a validation of the at least one object. Such validation may include comparing data of the network model associated with the at least one object with data associated with a resource represented by the network object which is stored in at least one data source separate from the network model (e.g. a data source representing the actual network configuration). Thus, the validation may include the aforementioned comparisons between the network model and an actual network configuration.

To this end, it may be determined that the at least one discrepancy has been identified for the at least one object if the data of the network model associated with the at least one object does not match the data associated with the resource represented by the network object which is stored in the at least one data source separate from the network model. In one embodiment, the aforementioned determination may be made based on the validation being performed in response to the request to create the design of the at least a portion of the network model. In another embodiment, the validation may be performed prior to the request to create the design of the at least a portion of the network model, and the aforementioned determination may be based on a stored result of the validation performed prior to the request to create the design of the at least a portion of the network model.

Moreover, as shown in operation 308, a response to the request is provided that is based on the determination of whether the at least one discrepancy has been identified for the at least one object. In the present description, the response may include any action taken which is responsive to the request. As noted above, the particular response may be based on the determination of whether the at least one discrepancy has been identified for the at least one object, such that a response when the at least one discrepancy has been identified for the at least one object may be different than a response when the at least one discrepancy has not been identified for the at least one object.

For example, in response to a determination that the at least one discrepancy has not been identified, the provided response may include satisfying the request to create the design of the at least a portion of the network model. Thus, the design of the at least a portion of the network model may be created in response to the request when it is determined that the at least one discrepancy has not been identified. This may allow the request to be satisfied when there are no known discrepancies associated with the object, such that an accuracy of the design may be ensured.

As another example, in response to a determination that the at least one discrepancy has been identified, the provided response may include displaying an indicator of the at least one discrepancy via the interface. In such example, where the request was initiated by a user via the GUI, the provided response may include displaying on the interface the indicator of the at least one discrepancy (e.g. for viewing by the user).

As yet another example, in response to a determination that the at least one discrepancy has been identified, the provided response may include at least temporarily preventing a satisfaction of the request to create the design of the at least a portion of the network model, in addition to optionally issuing a request for a resolution of the at least one discrepancy or issuing a request to use another object representative of a different resource to satisfy the request (i.e. by creating at least a similar design). In one embodiment, satisfaction of the request, as described above, may be delayed until the at least one discrepancy is resolved (e.g. as determined from a subsequent validation of the at least one object, etc.). In another embodiment, satisfaction of the request, as described above, may be prevented in its entirety, such that another request for the same design may be required to be received after the resolution of the at least one discrepancy in order for the request to be satisfied.

As described above, the network model design process (e.g. the receiving of design requests and the satisfaction of those requests) may be integrated with the identification of discrepancies associated with the network model. This may optionally allow the network model design process to be dependent on the identification of discrepancies associated with the network model, and to further initiate resolution of any identified discrepancies when such discrepancies are associated with a design requested to be created within the network model.

As noted above, such integration between the network model design process and the identification of discrepancies associated with the network model may ensure creation of accurate designs (i.e. designs without discrepancies). Furthermore, this proactive automatic validation of the object in response to the request to create the design may prevent inaccurate designs from being forwarded to processes that manage the implementation of the design. This may accordingly reduce service outages or other problems resulting from inaccurate designs.

In addition, the aforementioned integration may reduce a time period required to implement such accurate designs, for example by initiating resolution of associated discrepancies in response to the request to create the design. This may allow for the resolution of discrepancies to be prioritized according to an order of receipt of requests to create network model designs otherwise having such discrepancies.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
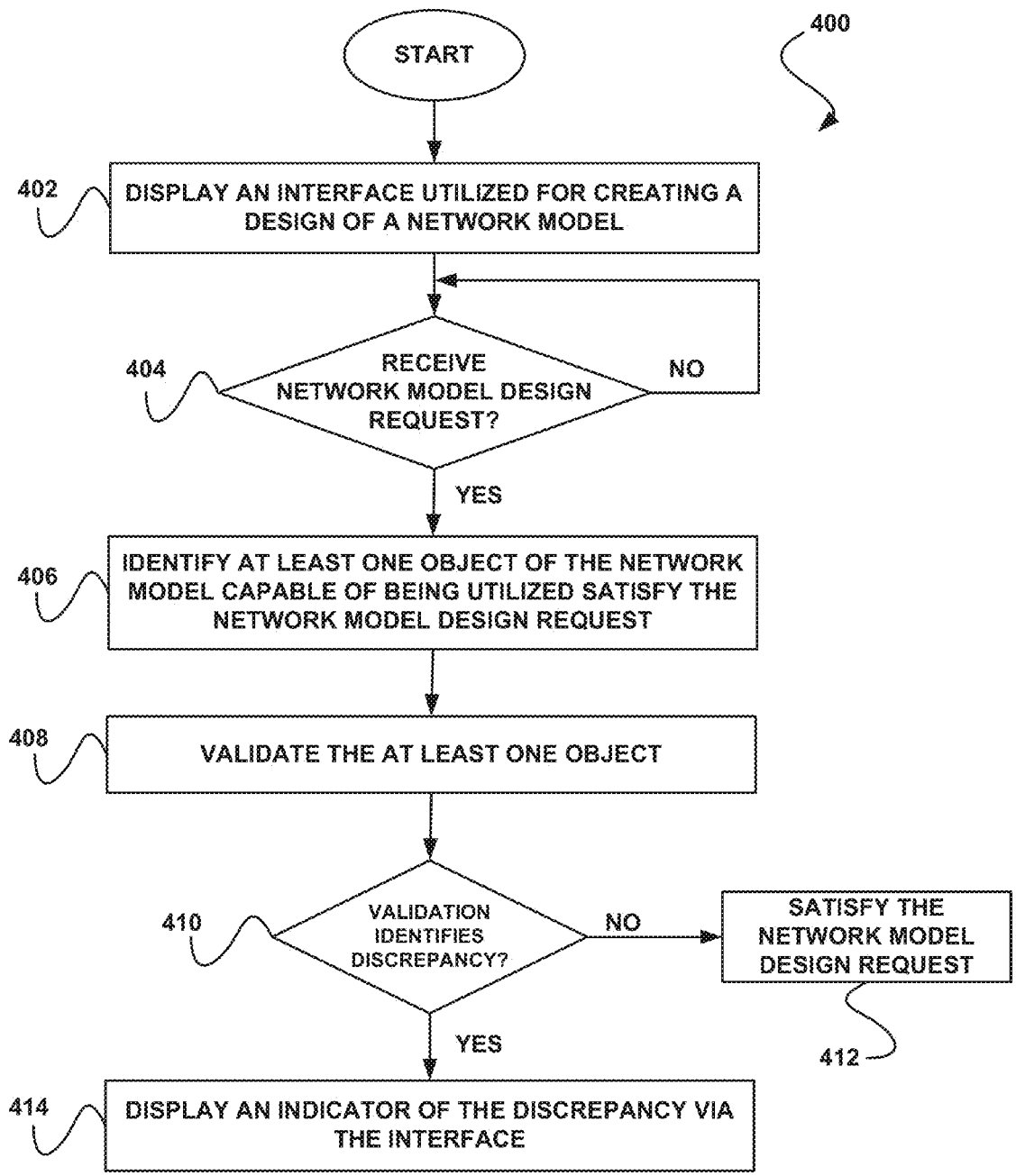
FIG. 4 illustrates a method for providing validation of network model objects within a manually initiated network model design process, in accordance with another embodiment.

FIG. 4 illustrates a method 400 for providing validation of network model objects within a manually initiated network model design process, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in operation 402, an interface utilized for creating a design of a network model is displayed. The design of the network model may include a planned configuration of a network, such that that the designed network model may represent the planned configuration for the network. The interface, in the present embodiment, may include a GUI with which a user may view information and interact (e.g. input information, etc.).

It is then determined whether a network model design request is received. Note decision 404. Such network model design request may be received via the interface from a user. For example, the interface may provide options to the user for selecting parameters of a network model design (e.g. objects to be included in the design, an interconnection between such objects, a location in the network model to place such objects, etc.), and further for requesting creation of the network model design based on the selected parameters.

If it is determined that a network model design request is not received, the method 400 continues to wait for receipt of such a request. However, once a network model design request is received, at least one object of the network model capable of being utilized to satisfy the network model design request is identified. Note operation 406. The object may be identified from the request (e.g. based on the selection by the user via the interface, as described above).

Additionally, the at least one object is validated, as shown in operation 408. In the present embodiment, the object may be validated to identify any discrepancies associated therewith. For example, data associated with the object in the network model may be compared to data associated with a resource represented by the object which is stored in another data source (e.g. a data source storing data representative of an actual network configuration). If the comparison results in unmatched data between the network model and the other data source, then such unmatched data may be identified as a discrepancy associated with the object.

In decision 410 it is determined whether the validation identifies any discrepancies. If it is determined that the validation does not identify any discrepancies, the network model design request is satisfied. Note operation 412. In particular, the requested network model design may be created.

If it is determined that the validation identifies at least one discrepancy, an indicator of the identified discrepancy is displayed via the interface, as shown in operation 414. For example, the identified discrepancy may be displayed as a visual warning (e.g. error message) that the requested network model design has dependencies on an object that is known to be associated with a discrepancy (e.g. is known to be inaccurate). As another example, the object may include an icon representing the associated resource, and the visual warning may be displayed alongside the icon to highlight the identified discrepancy. As yet another example, the icon may be selected by the user to view (e.g. in a pop-up window, etc.) details of the identified discrepancy.

Figure 5:
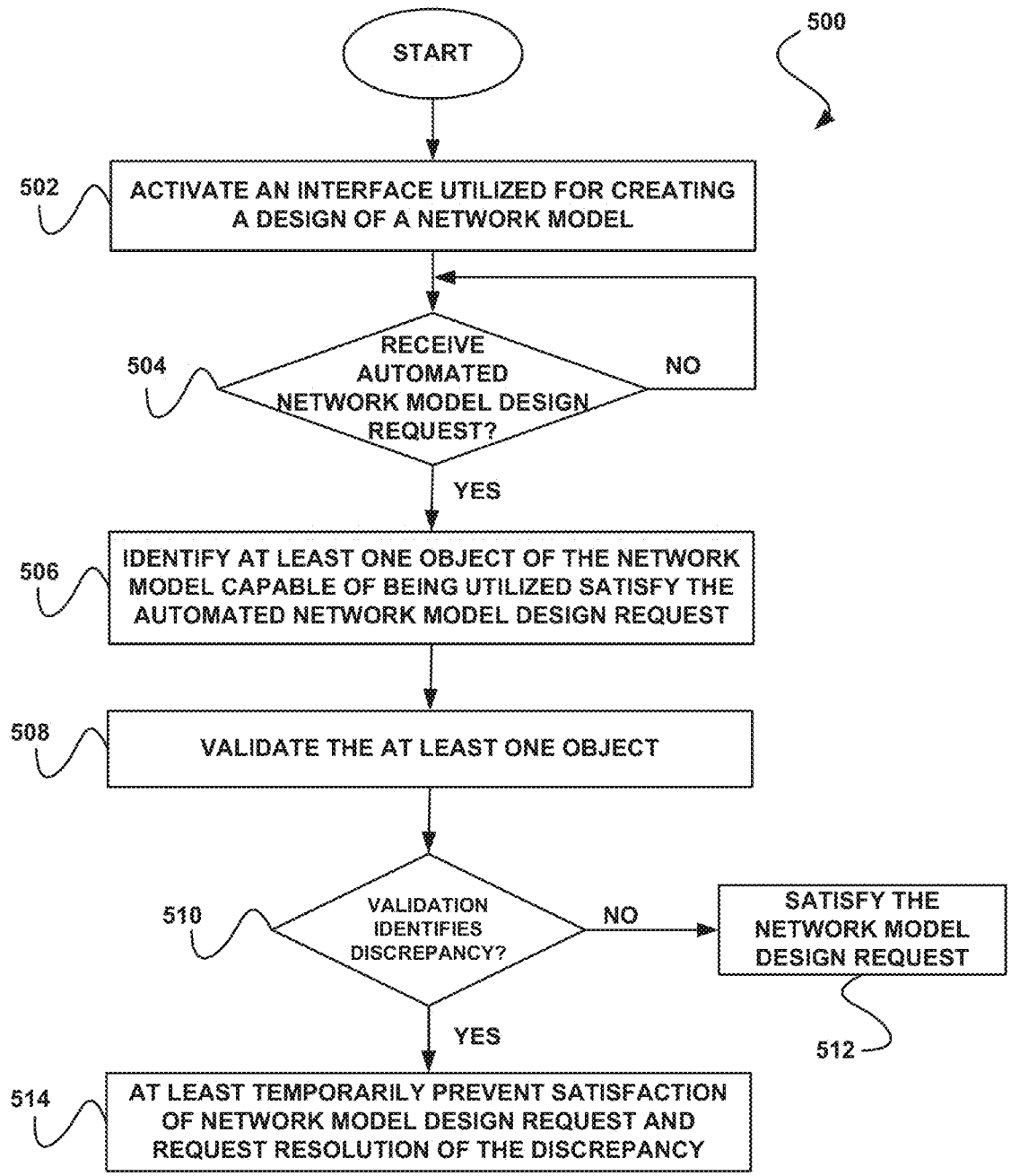
FIG. 5 illustrates a method for providing validation of network model objects within an automatically initiated network model design process, in accordance with yet another embodiment.

FIG. 5 illustrates a method 500 for providing validation of network model objects within an automatically initiated network model design process, in accordance with yet another embodiment. As an option, the method 500 may be carried out in the context of the details of FIGS. 1-4. Of course, however, the method 500 may be carried out in any desired environment. Yet again, the aforementioned definitions may equally apply to the description below.

As shown in operation 502, an interface utilized for creating a design of a network model is activated. For example, the interface may be activated for receiving network model design requests from applications. Such applications may be capable of automatically initiating network model design requests based on predefined rules, for example. The interface may be activated upon start-up of a system utilized for executing the interface, in one embodiment.

It is then determined in decision 504 whether an automated network model design request is received. The automated network model design request may be a request for a network model design that is automatically initiated by an application. If it is determined that an automated network model design request is not received, the method 500 continues to wait for receipt of such an automated network model design request.

In response to receipt of an automated network model design request, at least one object of the network model capable of being utilized to satisfy the network model design request is identified. Note operation 506. The object may be identified from the request. For example, the application may include a parameter identifying the object in the automated network model design request.

Additionally, the at least one object is validated, as shown in operation 508. In the present embodiment, the object may be validated to identify any discrepancies associated therewith. For example, data associated with the object in the network model may be compared to data associated with a resource represented by the object which is stored in another data source (e.g. a data source storing data representative of an actual network configuration). If the comparison results in unmatched data between the network model and the other data source, then such unmatched data may be identified as a discrepancy associated with the object.

In decision 510 it is determined whether the validation identifies any discrepancies. If it is determined that the validation does not identify any discrepancies, the network model design request is satisfied. Note operation 512. In particular, the requested network model design may be created.

If it is determined that the validation identifies at least one discrepancy, satisfaction of the network model design request is at least temporarily prevented and a resolution of the discrepancy is requested. Note operation 514. For example, resources known to have discrepancies may be prevented from being used in the requested network model design, and further a task or other action item requesting resolution of the discrepancies may be generated (e.g. for viewing by a user to allow the user to take action to resolve the discrepancies or for identification by an application to allow the application to automatically take action to resolve the discrepancies).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for receiving a request to create a design of at least a portion of a model of a network, the request indicating a selection of an object representing a resource of the network, and the object for use in creating the design of the at least a portion of the network model, wherein the request is received via an interface utilized for creating the design of the at least a portion of the network model;
    computer code for, in response to receiving the request to create the design of the at least a portion of the network model, identifying the object selected for use in creating the design of the at least a portion of the network model;
    computer code for determining that at least one discrepancy has been identified for the object from a validation of the object performed prior to receiving the request to create the design of the at least a portion of the network model, wherein the determination that the at least one discrepancy has been identified for the object is based on a stored result of the validation of the object performed prior to receiving the request to create the design of the at least a portion of the network model; and
    computer code for providing a response to the request to create the design of the at least a portion of the network model that is based on the determination that the at least one discrepancy has been identified for the object, wherein the response to the request is provided prior to satisfying the request to create the design of the at least a portion of the network model;
    wherein the computer program is operable such that in response to the determination that the at least one discrepancy has been identified, the provided response includes at least temporarily preventing a satisfaction of the request to create the design of the at least a portion of the network model, such that the request to create the design of the at least a portion of the network model is required to be resubmitted after the at least one discrepancy is resolved in order for the request to be satisfied.

2. The computer program of claim 1, wherein the design of the at least a portion of the network model includes a design of a planned configuration of the network.

3. The computer program of claim 1, wherein the design of the at least a portion of the network model includes a design of a planned configuration of interconnections associated with a portion of the network.

4. The computer program of claim 1, wherein the design of the at least a portion of the network model includes a design of a planned configuration of interconnections associated with the resource within at least a portion of the network.

5. The computer program of claim 1, wherein the computer program is operable such that the request to create the design of the at least a portion of the network model is manually initiated by a user via the interface utilized for creating the design of the at least a portion of the network model.

6. The computer program of claim 5, wherein the interface is a graphical user interface.

7. The computer program of claim 1, wherein the computer program is operable such that the request to create the design of the at least a portion of the network model is automatically initiated by an application via the interface utilized for creating the design of the at least a portion of the network model.

8. The computer program of claim 1, wherein the computer program is operable such that the request to create the design of the at least a portion of the network model indicates the design of the at least a portion of the network model.

9. The computer program of claim 1, wherein the computer program is operable such that the object is identified from the request to create the design of the at least a portion of the network model.

10. The computer program of claim 1, wherein the computer program is operable such that in response to the determination that the at least one discrepancy has been identified, the provided response includes displaying an indicator of the at least one discrepancy via the interface.

11. The computer program of claim 1, wherein the computer program is operable such that in response to the determination that the at least one discrepancy has been identified, the provided response further includes issuing another request to resolve the at least one discrepancy.

12. The computer program of claim 1, wherein the request further indicates a selected action to be performed with respect to the object.

13. A method, comprising:
receiving a request to create a design of at least a portion of a model of a network, the request indicating a selection of an object representing a resource of the network, and the object for use in creating the design of the at least a portion of the network model, wherein the request is received via an interface utilized for creating the design of the at least a portion of the network model;
in response to receiving the request to create the design of the at least a portion of the network model, identifying the object selected for use in creating the design of the at least a portion of the network model;
determining that at least one discrepancy has been identified for the object from a validation of the object performed prior to receiving the request to create the design of the at least a portion of the network model, wherein the determination that the at least one discrepancy has been identified for the object is based on a stored result of the validation of the object performed prior to receiving the request to create the design of the at least a portion of the network model; and
providing a response to the request to create the design of the at least a portion of the network model that is based on the determination that the at least one discrepancy has been identified for the object by utilizing a processor, wherein the response to the request is provided prior to satisfying the request to create the design of the at least a portion of the network model;
wherein, in response to the determination that the at least one discrepancy has been identified, the provided response includes at least temporarily preventing a satisfaction of the request to create the design of the at least a portion of the network model, such that the request to create the design of the at least a portion of the network model is required to be resubmitted after the at least one discrepancy is resolved in order for the request to be satisfied.

14. A system, comprising:
a processor for:
receiving a request to create a design of at least a portion of a model of a network, the request indicating a selection of an object representing a resource of the network, and the object for use in creating the design of the at least a portion of the network model, wherein the request is received via an interface utilized for creating the design of the at least a portion of the network model;
in response to receiving the request to create the design of the at least a portion of the network model, identifying the object selected for use in creating the design of the at least a portion of the network model;
determining that at least one discrepancy has been identified for the object from a validation of the object performed prior to receiving the request to create the design of the at least a portion of the network model, wherein the determination that the at least one discrepancy has been identified for the object is based on a stored result of the validation of the object performed prior to receiving the request to create the design of the at least a portion of the network model; and
providing a response to the request to create the design of the at least a portion of the network model that is based on the determination that the at least one discrepancy has been identified for the object, wherein the response to the request is provided prior to satisfying the request to create the design of the at least a portion of the network model;
wherein the system is operable such that in response to the determination that the at least one discrepancy has been identified, the provided response includes at least temporarily preventing a satisfaction of the request to create the design of the at least a portion of the network model, such that the request to create the design of the at least a portion of the network model is required to be resubmitted after the at least one discrepancy is resolved in order for the request to be satisfied.

15. The system of claim 14, wherein the processor is coupled to memory via a bus.

* * * * *